(12) United States Patent
Beaumont

(10) Patent No.: US 7,472,392 B2
(45) Date of Patent: *Dec. 30, 2008

(54) METHOD FOR LOAD BALANCING AN N-DIMENSIONAL ARRAY OF PARALLEL PROCESSING ELEMENTS

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 914 days.

This patent is subject to a terminal disclaimer.

(21) Appl. No.: 10/689,365

(22) Filed: Oct. 20, 2003

(65) Prior Publication Data

US 2004/0216119 A1 Oct. 28, 2004

(30) Foreign Application Priority Data

Apr. 23, 2003 (GB) ................................ 0309204.6

(51) Int. Cl.
*G06F 9/46* (2006.01)
*G06F 15/00* (2006.01)
*G06F 15/76* (2006.01)

(52) U.S. Cl. .................... 718/105; 718/104; 712/10; 712/16

(58) Field of Classification Search ......... 718/100–108, 718/1; 712/10, 11, 16, 28, 32
See application file for complete search history.

(56) References Cited

U.S. PATENT DOCUMENTS

| 4,386,413 | A |   | 5/1983 | Vignes et al. |
| 4,633,387 | A | * | 12/1986 | Hartung et al. ............ 718/105 |
| 4,992,933 | A | * | 2/1991 | Taylor ......................... 712/22 |
| 5,109,512 | A | * | 4/1992 | Bahr et al. ................... 718/103 |
| 5,241,677 | A |   | 8/1993 | Naganuma et al. |
| 5,535,387 | A |   | 7/1996 | Matsouka et al. |
| 5,581,773 | A |   | 12/1996 | Glover |

(Continued)

FOREIGN PATENT DOCUMENTS

WO    WO 2001/088696 A3    11/2001

(Continued)

OTHER PUBLICATIONS

Larry Rudolph, Miriam Slivkin-Allalouf, Eli Upfal; A Simple Load Balancing Scheme for Task Allocation in Parallel Machines; 1991 ACM.*

(Continued)

*Primary Examiner*—Thomas Lee
*Assistant Examiner*—Abdullah Al Kawsar
(74) *Attorney, Agent, or Firm*—Jones Day; Edward L. Pencoske

(57) ABSTRACT

One aspect of the present invention relates to a method for balancing the load of an n-dimensional array of processing elements (PEs), wherein each dimension of the array includes the processing elements arranged in a plurality of lines and wherein each of the PEs has a local number of tasks associated therewith. The method comprises balancing at least one line of PEs in a first dimension, balancing at least one line of PEs in a next dimension, and repeating the balancing at least one line of PEs in a next dimension for each dimension of the n-dimensional array. The method may further comprise selecting one or more lines within said first dimension and shifting the number of tasks assigned to PEs in said selected one or more lines.

30 Claims, 13 Drawing Sheets

U.S. PATENT DOCUMENTS

| | | | |
|---|---|---|---|
| 5,630,129 A * | 5/1997 | Wheat | 718/105 |
| 5,701,482 A * | 12/1997 | Harrison et al. | 718/105 |
| 5,850,489 A | 12/1998 | Rich | |
| 5,892,517 A | 4/1999 | Rich | |
| 5,966,528 A | 10/1999 | Wilkinson et al. | |
| 6,078,945 A | 6/2000 | Hinsley | |
| 6,219,776 B1 | 4/2001 | Pechanek et al. | |
| 6,279,088 B1 | 8/2001 | Elliott et al. | |
| 6,292,822 B1 | 9/2001 | Hardwick | |
| 6,392,822 B1 * | 5/2002 | Takahashi | 359/728 |
| 6,404,439 B1 | 6/2002 | Coulombe et al. | |
| 6,421,772 B1 | 7/2002 | Maeda et al. | |
| 6,430,618 B1 | 8/2002 | Karger et al. | |
| 6,587,938 B1 * | 7/2003 | Eilert et al. | 712/29 |
| 6,651,082 B1 * | 11/2003 | Kawase et al. | 718/105 |
| 2004/0024874 A1 * | 2/2004 | Smith | 709/225 |

OTHER PUBLICATIONS

Finnet Thomas; Calculus; Second Edition 1994.*

Daehyun Kim, Mainak Chaudhuri, and Mark Heinrich, Leveraging Cache Coherence in Active Memory Systems, Proceedings of the 16th ACM.

Mainak Chaudhuri, Daehyun Kim, and Mark Heinrich, Cache Coherence Protocol Design for Active Memory Systems, Proceedings of the 2002.

* cited by examiner

Matrix 50e (rows 1-8, 8 columns):

| | | | | | | | |
|---|---|---|---|---|---|---|---|
| 1 | 0 | 0 | 0 | 0 | 0 | 0 | 0 |
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |
| 0 | 0 | 0 | 0 | 0 | 0 | 0 | 0 |

Column sums table:

| Old Col. Sum | Current Line | New Col. Sum1 | Current Line | New Col. Sum 2 | Current Line | New Col. Sum 3 | Current Line | New Col. Sum 4 | Current Line | New Col. Sum 5 | Current Line | New Col. Sum 6 | Current Line | New Col. Sum 7 |
|---|---|---|---|---|---|---|---|---|---|---|---|---|---|---|
| 1 | 0 | 1 | 0 | 1 | 0 | 1 | 0 | 1 | 1 | 2 | 1 | 3 | 0 | 3 |
| 0 | 0 | 0 | 0 | 0 | 1 | 1 | 1 | 2 | 1 | 3 | 0 | 3 | 0 | 3 |
| 0 | 0 | 0 | 1 | 1 | 0 | 1 | 1 | 2 | 1 | 3 | 1 | 4 | 0 | 4 |
| 0 | 1 | 1 | 0 | 1 | 0 | 1 | 1 | 2 | 1 | 3 | 1 | 4 | 0 | 4 |
| 0 | 0 | 0 | 0 | 0 | 1 | 1 | 1 | 2 | 1 | 3 | 1 | 4 | 0 | 4 |
| 0 | 0 | 0 | 1 | 1 | 1 | 2 | 0 | 2 | 1 | 3 | 1 | 4 | 0 | 4 |
| 0 | 1 | 1 | 0 | 1 | 0 | 1 | 1 | 2 | 0 | 2 | 1 | 3 | 0 | 3 |
| 0 | 0 | 0 | 1 | 1 | 1 | 2 | 0 | 2 | 0 | 2 | 1 | 3 | 0 | 3 |

| 41 | V | | $E_r$ | 0 | 1 | 2 | 3 | 4 | 5 | 6 | 7 |
|---|---|---|---|---|---|---|---|---|---|---|---|
| 1 | Q | | $M_r$ | 5 | 5 | 5 | 5 | 5 | 5 | 5 | 6 |
| 34 | V | | $E_r$ | 0 | 1 | 2 | 3 | 4 | 5 | 6 | 7 |
| 2 | Q | | $M_r$ | 4 | 4 | 4 | 4 | 4 | 5 | 5 | 4 |
| 27 | V | | $E_r$ | 0 | 1 | 2 | 3 | 4 | 5 | 6 | 7 |
| 3 | Q | | $M_r$ | 3 | 3 | 4 | 4 | 4 | 3 | 3 | 3 |
| 36 | V | | $E_r$ | 0 | 1 | 2 | 3 | 4 | 5 | 6 | 7 |
| 3 | Q | | $M_r$ | 5 | 5 | 4 | 4 | 4 | 4 | 5 | 5 |
| 37 | V | | $E_r$ | 0 | 1 | 2 | 3 | 4 | 5 | 6 | 7 |
| 5 | Q | | $M_r$ | 4 | 5 | 5 | 5 | 5 | 5 | 4 | 4 |
| 30 | V | | $E_r$ | 0 | 1 | 2 | 3 | 4 | 5 | 6 | 7 |
| 6 | Q | | $M_r$ | 4 | 3 | 3 | 4 | 4 | 4 | 4 | 4 |
| 23 | V | | $E_r$ | 0 | 1 | 2 | 3 | 4 | 5 | 6 | 7 |
| 7 | Q | | $M_r$ | 3 | 3 | 3 | 2 | 3 | 3 | 3 | 3 |
| 32 | V | | $E_r$ | 0 | 1 | 2 | 3 | 4 | 5 | 6 | 7 |
| 0 | Q | | $M_r$ | 4 | 4 | 4 | 4 | 4 | 4 | 4 | 4 |

FIG 8

METHOD FOR LOAD BALANCING AN N-DIMENSIONAL ARRAY OF PARALLEL PROCESSING ELEMENTS

CROSS-REFERENCE TO RELATED APPLICATIONS

The present application is related to U.S. patent application Ser. No. 10/689,345 entitled "Method for Load Balancing a Line of Parallel Processing Elements" filed 20 Oct. 2003, U.S. patent application Ser. No. 10/689,312 entitled "Method for Using Extrema to Load Balance a Loop of Parallel Processing Elements" filed 20 Oct. 2003, U.S. patent application Ser. No. 10/689,336 entitled "Method for Load Balancing a Loop of Parallel Processing Elements" filed 20 Oct. 2003, U.S. patent application Ser. No. 10/689,355 entitled "Method for Using Filtering to Load Balance a Loop of Parallel Processing Elements" filed 20 Oct. 2003, U.S. patent application Ser. No. 10/689,382 entitled "Method for Rounding Values for a Plurality of Parallel Processing Elements" filed 20 Oct. 2003, and U.S. patent application Ser. No . 10/689,280 entitled "Method of Obtaining Interleave Interval for Two Data Values" filed 20 Oct. 2003.

BACKGROUND OF THE INVENTION

The present invention relates generally to parallel processing and more particularly to balancing the work loads of the processing elements within a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the X processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

In typical active memories, load imbalances often occur such that some PEs are idle (i.e., without assigned tasks) while other PEs have multiple tasks assigned. To maximize the effectiveness of the active memory, it is desirable to balance the work load across all of the PEs. For example in an active memory having a multitude of identical PEs, it is desirable that each PE be assigned the same number of instructions by the central sequencer, thus maximizing the resources of the active memory. Additionally in an active memory having non-identical PEs, it may be desirable to assign more tasks to the PEs with greater processing capabilities. By balancing the load, the amount of time that one or more PEs is idle while waiting for one or more other PEs to complete their assigned tasks is minimized.

Thus, there exists a need for a method for balancing the load of a parallel processing system such that the resources of the parallel processing system are maximized. More specifically, there exists a need for a method for balancing the load of an active memory such that the resources of the active memory are maximized.

SUMMARY OF THE INVENTION

One aspect of the present invention relates to a method for balancing the load of an n-dimensional array of processing elements (PEs), wherein each dimension of the array includes the processing elements arranged in a plurality of lines and wherein each of the PEs has a local number of tasks associated therewith. The method comprises balancing at least one line of PEs in a first dimension, balancing at least one line of PEs in a next dimension, and repeating the balancing at least one line of PEs in a next dimension for each dimension of the n-dimensional array.

The method of balancing at least one line of PEs in a first dimension and balancing at least one line of PEs in a next dimension may comprise calculating a total number of tasks for the line, wherein the total number of tasks for the line equals the sum of the local number of tasks for each PE on the line, notifying each PE on the line of the total number of tasks for the line, calculating a local mean number of tasks for each PE on the line, calculating a local deviation for each PE on the line, determining a first local cumulative deviation for each PE on the line, determining a second local cumulative deviation for each PE on the line and redistributing tasks among the PEs on the line in response to at least one of the first local cumulative deviation and the second local cumulative deviation.

The method may further comprise selecting one or more lines within the first dimension and shifting the number of tasks assigned to PEs in the selected one or more lines.

Another aspect of the invention relates to a method for balancing an n-dimensional array of processing elements, wherein each of the n-dimensions is traversed by a plurality of lines and wherein each of the lines has a plurality of processing elements with a local number of tasks associated therewith. The method comprises balancing the plurality of lines in one dimension, wherein each of the balanced lines includes PEs with one of X local number of tasks and (X+1) local number of tasks, substituting the value zero (0) for each processing element having X local number of tasks, substituting the value one (1) for each processing element having (X+1) local number of tasks, and shifting the values for each processing element within the balanced lines until a sum of the processing elements relative to a second dimension has only two values.

The present invention enables tasks to be distributed along a group of serially connected PEs so that each PE typically has X number of tasks or (X+1) number of tasks to perform in the next phase. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein:

FIG. 6 is a graphical representation of a general load balancing method as applied to the array of processing elements illustrated in FIG. 3a according to one embodiment of the present invention.

FIG. 7 is a graphical representation of the general load balancing method as applied to the array of processing elements illustrated in FIG. 3a according to an alternative embodiment of the present invention.

FIG. 8 illustrates the general load balancing method as applied to the array of processing elements illustrated in FIG. 3a according to the alternative embodiment of the present invention.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
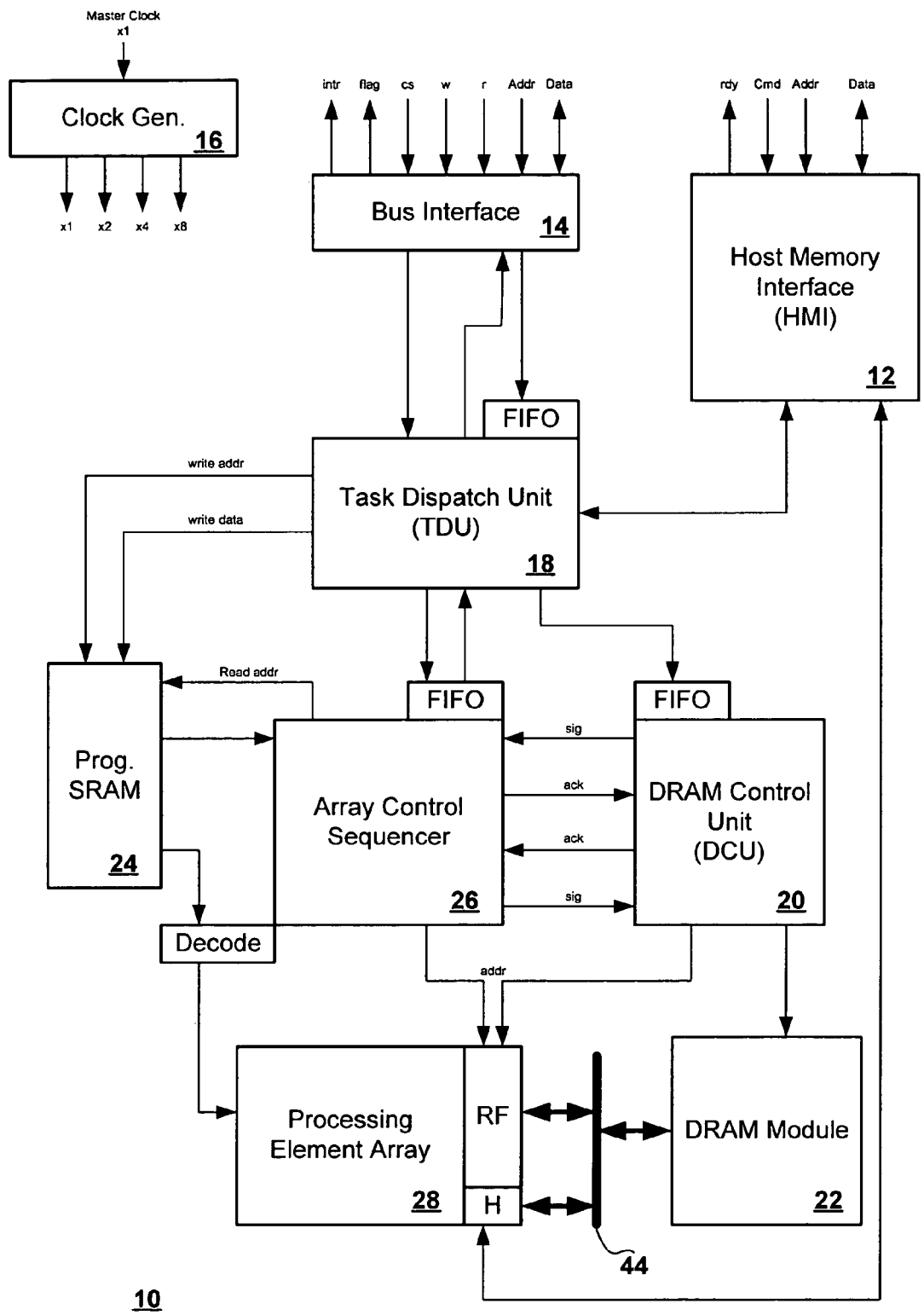
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus, the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus requiring 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 is comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. In the current embodiment, the processing elements 30 are arranged in a two-dimensional array (for example, see FIG. 3a and FIG. 3b). The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
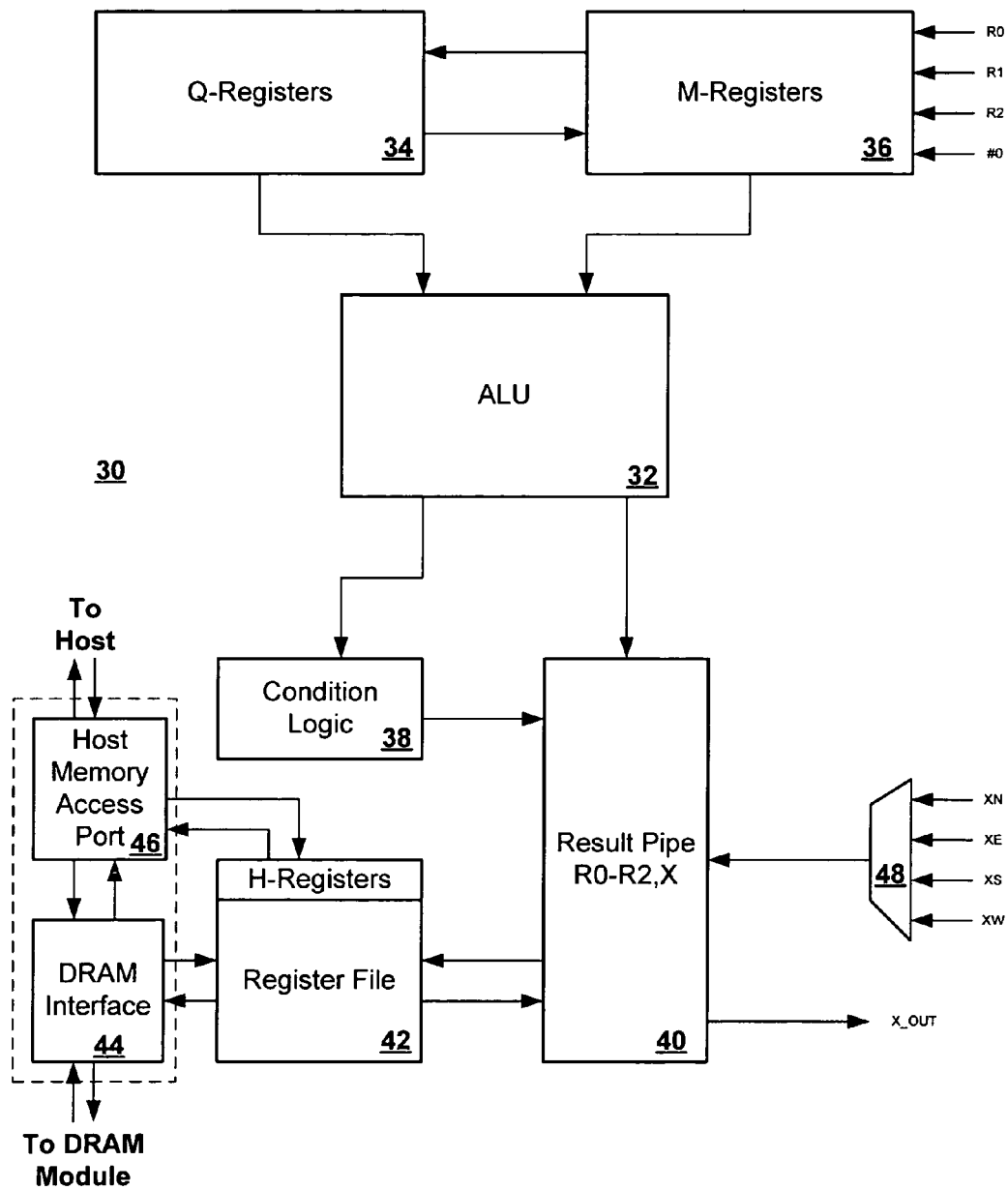
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format. The ALU 32 is a multiplier-adder operable (among others) to receive information from the Q-registers 34 and M-registers 36, execute tasks assigned by the TDU 18 (see FIG. 1), and transmit results to the shift control and condition register 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28.

The reader desiring more information about the hardware shown in FIGS. 1 and 2 is directed to UK Patent application No. 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, which is hereby incorporated by reference.

Figure 3A:
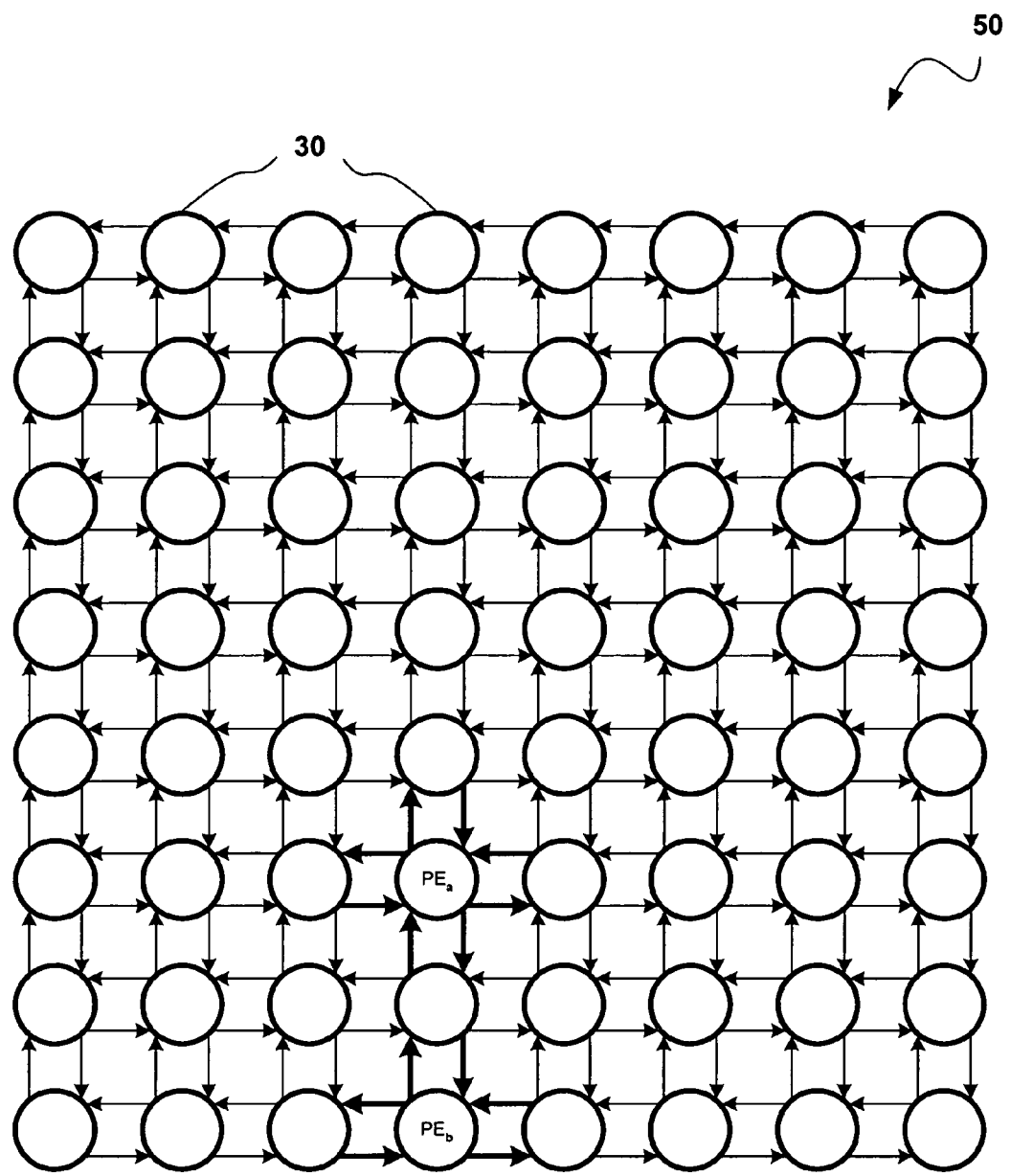
FIG. 3a illustrates the processing elements of FIG. 2 arranged in an simple-connected two-dimensional array according to an embodiment of the present invention.
Figure 3B:
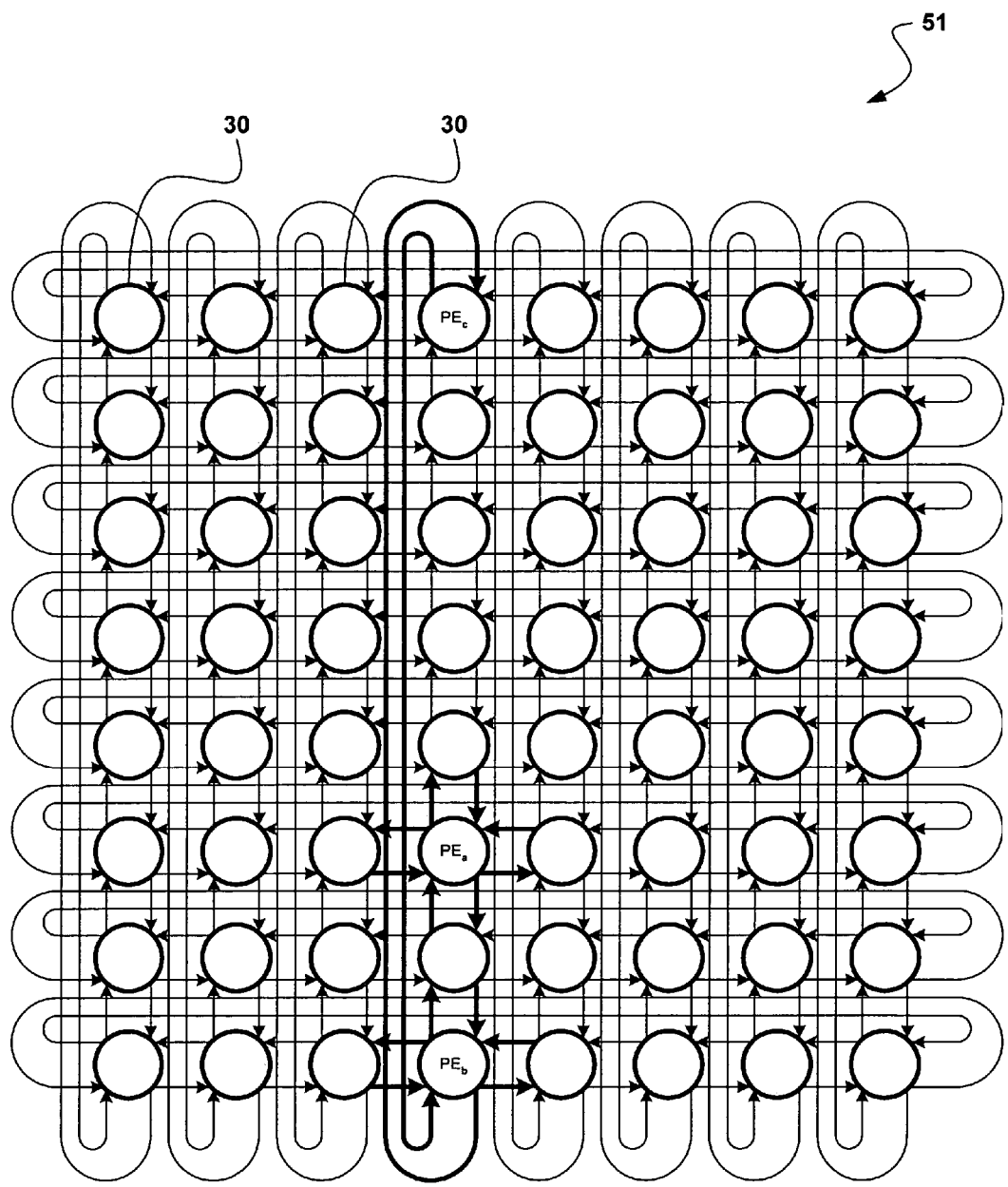
FIG. 3b illustrates the processing elements of FIG. 2 arranged in an loop-connected two-dimensional array according to an embodiment of the present invention.

FIGS. 3a and 3b are simplified diagrams showing the processing elements 30 (as illustrated in FIG. 2) interconnected in an 8×8 2-dimensional array according to an embodiment of the present invention. For simplicity, the instant discussion will be limited to the 8×8 2-D array. The instant discussion of the 8×8 2-D array, however, is in no way intended to limit the scope of the present invention. It should be noted that the present invention is applicable to any n-dimensional array of processing elements wherein each dimension has a number of lines traversing it and wherein each of the lines having a plurality of processing elements with a local number of tasks associated therewith. For example, the present invention may be used to balance an K×L×M×... etc., n-dimensional array of processing elements (PEs), wherein K represents the number of PEs on a line traversing a first dimension of the array, L represents the number of PEs on a line traversing a second dimension of the array, M represents the number of PEs on a line traversing a third dimension of the array, etc. More generally, the present invention may be used to balance and an array having (N) PE's traversing each line in a dimension, where N may be different for each dimension.

FIG. 3a is an illustration of a simple connected 8×8 2-D array 50 A simple connected array refers to an array whose edge PEs have a reduced level of connectivity. More specifically in a simple connected 2-D array, each edge PE can transfer data to only three neighboring PEs, whereas each non-edge PE can transfer data to four neighboring PEs. For example in FIG. 3a, $PE_a$ is a non-edge PE which can communicate with its neighbors to the north, south, east, and west (as indicated by the darker arrows), whereas $PE_b$ is an edge PE which can communicate only with its neighbors to the north, east, and west (as indicated by the darker arrows).

FIG. 3b is an illustration of a loop connected 8×8 2-D array 51. A loop connected array refers to an array whose edge PEs have a similar level of connectivity as non-edge arrays. More specifically in a loop connected 2-D array, the connections between edge PE's "wrap" around the column and rows, thus, both edge and non-edge PEs can transfer data to four neighboring PEs. For example in FIG. 3b, $PE_a$ is a non-edge PE which can communicate with its neighbors to the north, south, east, and west (as indicated by the darker arrows), and even though $PE_b$ is an edge PE, $PE_b$ can communicate with it neighbors to the north, east, and west and with its "southern" neighbor $PE_c$ due to the loop connection (as indicated by the darker arrows).

Loop connection for an n-dimensional array provides 2N neighbors for each PE (i.e., two neighbors in each dimension). In contrast, simple connection for the n-dimensional case provides a reduced (2N−1) neighbors per edge PE (note the non-edge PEs still has 2N neighbors).

It should be noted that the number of PEs 30 included in the arrays 50, 51 may be altered while remaining within the scope of the present invention. Additionally, the number of dimensions for the arrays 50, 51 may be varied while remaining with the scope of the present invention. It should be further noted that each PE 30 has a number of tasks ($v_r$) associated therewith and each PE 30 is interconnected with its neighboring PEs via an associated X-register link (as discussed above in conjunction with FIG. 2). Accordingly, information can be shared among the PEs, thus permitting the task load of the arrays 50, 51 to be balanced.

Figure 4:
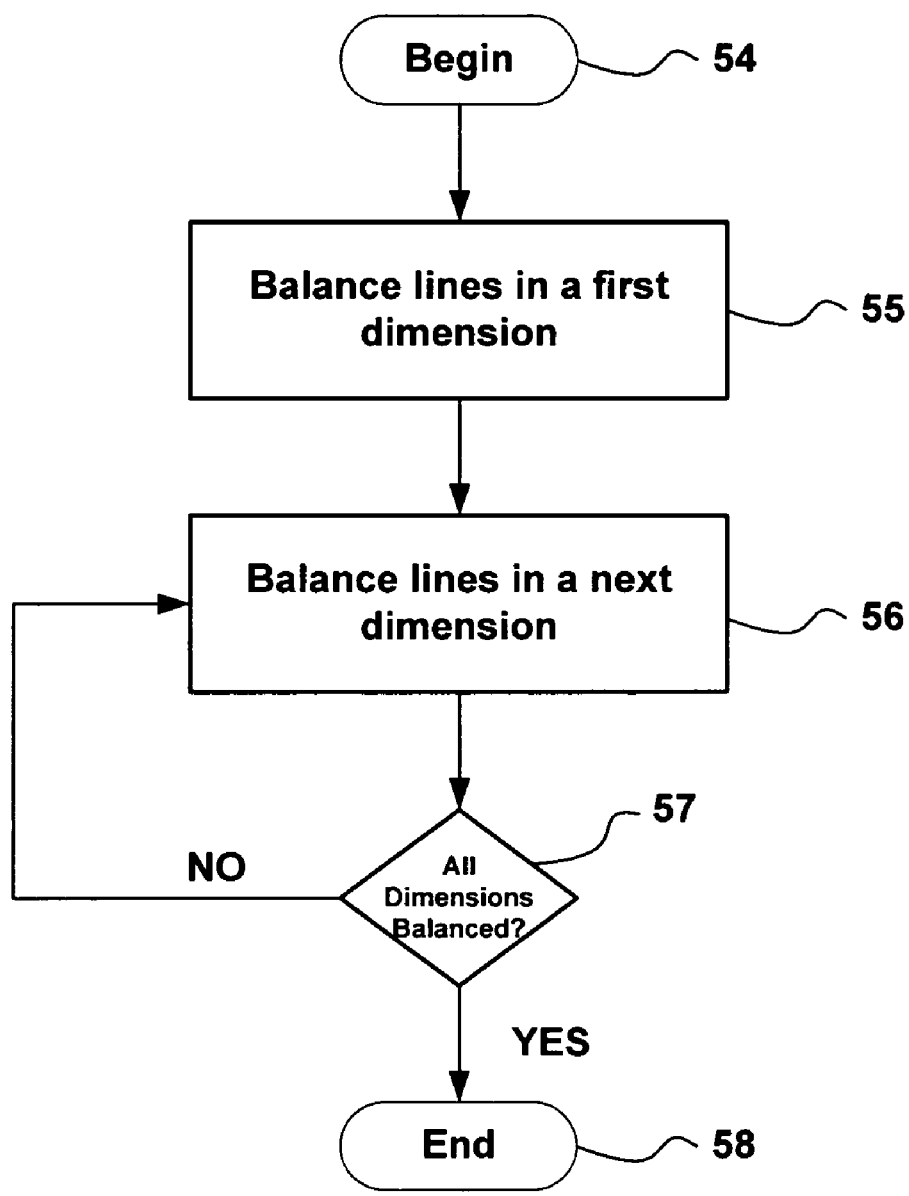
FIG. 4 illustrates an operational process for balancing the load of an n-dimensional array of processing elements according to an embodiment of the present invention.

FIG. 4 illustrates an operational process 53 for balancing the load of an n-dimensional array of processing elements according to an embodiment of the present invention. Operational process 53 is initiated by operation 54. In the current embodiment, operation 54 initiates operational process 53 when the TDU 18 determines that the load of a processing element array 28 requires balancing. For example, TDU 18 may determine that the range of tasks assigned to the PEs 30 within a processing element array 28 is too large (e.g., some PE's may have zero tasks assigned whereas other PEs may have multiple tasks assigned).

After operational process 53 is initiated, the lines in a first dimension are balanced in operation 55. In operation 55, each line in a single dimension may be balanced in parallel. For example, in the current embodiment, each row of array 50 is balanced in parallel in operation 55.

It should be noted that a "line" refers to a group of interconnected processing elements 30 within a single dimension of an n-dimensional array. For example, the 2-D arrays 50, 51 of the current embodiment have two sets of eight lines, i.e., the eight rows and eight columns. It should further be noted that in the current discussion, the term "line" is intended to include a loop connected group of PEs (among others), for example, as illustrated by array 51 in FIG. 3b.

After the lines of the first dimension are balanced in operation 55, the lines in a next dimension are balanced in operation 56. For example in the current embodiment, after the rows of array 50 are balanced in operation 55, the columns of the resulting row-balanced array are balanced in operation 56.

After the lines in the next dimension are balanced in operation 56, operation 57 determines whether all dimensions that require balancing have been balanced. If all dimensions have not been balanced, operational control branches NO and control is returned to operation 56. If all dimensions have been balanced, operational control branches YES and control is passed to operation 58 which terminates operational process 53.

Figure 5:
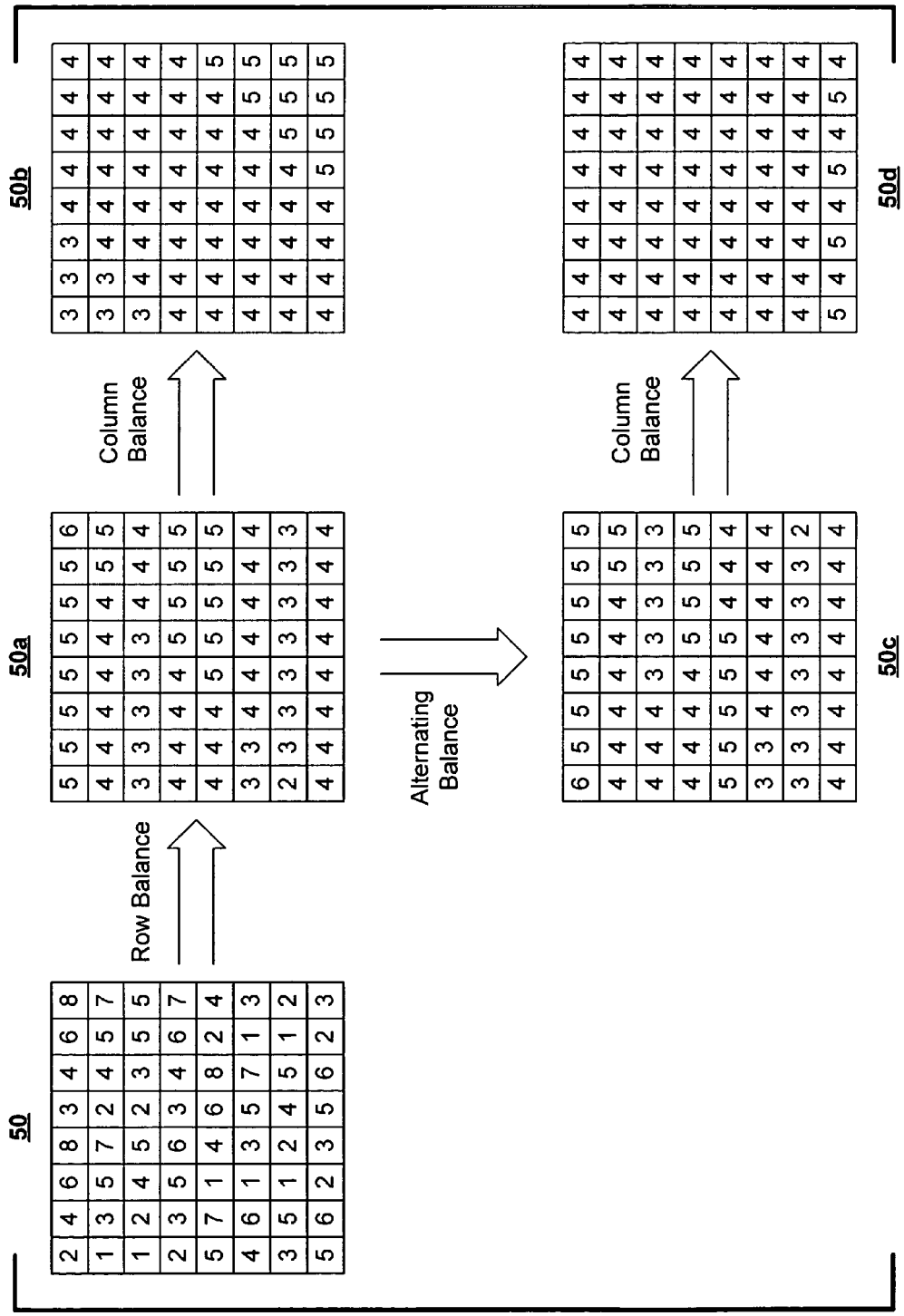
FIG. 5 is a graphical representation of a simple load balancing method and an alternating load balancing method as applied to the array of processing elements illustrated in FIG. 3a according to an embodiment of the present invention.

FIG. 5 is a graphical representation of results obtained using operational process 53 according to one embodiment of the present invention. FIG. 5 illustrates both a simple load balancing method and an alternating load balancing method as applied to the array of processing elements illustrated in FIG. 3a according to an embodiment of the present invention.

Referring to FIG. 5, a simplified representation of array 50 showing each PE's associated number of assigned tasks is illustrated. For example in the first row of array 50, $PE_0$ has 2 tasks assigned (i.e., $v_0=2$), $PE_1$ has 4 tasks assigned (i.e., $v_1=4$), $PE_2$ has 6 tasks assigned (i.e., $v_2=6$), etc. Likewise in the second row of array 50, $PE_0$ has 1 task assigned (i.e., $v_0=1$), $PE_1$ has 3 tasks assigned (i.e. $v_1=3$), $PE_2$ has 5 tasks assigned (i.e., $v_2=5$), etc.

FIG. 5 also illustrates row-balanced array 50a. In the current embodiment, row-balanced array 50a is determined by applying operation 55 to array 50. It is apparent that the row-balanced array 50a has a better distribution of tasks after each of its rows has been balanced than does unbalanced array 50. More specifically, the number of tasks assigned to the PEs in the array 50 prior to balancing ranges from a low of 1 to a high of 8, whereas the number of tasks assigned to the PEs in the row-balanced array 50a ranges from a low of 2 to a high of 6.

After the lines in the first dimension are balanced (e.g., the rows), the next dimension (e.g., the columns) is balanced in the simple load balancing method as described in conjunction with FIG. 4 according to an embodiment of the present invention. The method used to column-balance the array 50a is the same as that discussed above in conjunction with balancing a line in a first dimension in operation 55, except that instead of balancing each row, each column is balanced. The column-balanced array 50b is illustrated in FIG. 5. By comparing array 50a to array 50b, it is apparent that the column-balanced array 50b has a better distribution of tasks after each of its columns has been balanced. More specifically, the number of tasks assigned to the PEs in the array prior to column balancing ranges from a low of 2 to a high of 6, whereas the number of tasks assigned to the PEs in the array after column balancing ranges from a low of 3 to a high of 5.

It should be noted that array 50 is a two-dimensional array, thus in FIG. 4, operation 57 would branch YES to operation 58 which would terminate operational process 53. It should further be noted that after operational process 53 is completed there are a maximum of (n+1) different values for an n-dimensional array.

It is sometimes desirable to achieve an even greater balance (i.e., to reduce the range between the high and low number of tasks) among PEs in the array. Thus, FIG. 5 also illustrates an alternating balancing method for reducing the range between the high and low number of tasks among PEs in the array 50a. Prior to column balancing in the current embodiment (e.g., after operation 55 is completed), the task assignments for PEs in even rows (i.e., rows 0, 2, 4, 6, etc.) are shifted such that the larger number of tasks are assigned to PEs at the high address end of the row (e.g., $PE_0$, $PE_1$, etc.) and the smaller number of tasks are assigned to the lower address end of the row (e.g., $PE_7$, $PE_6$, etc.). The result of this alternating shifting is illustrated in array 50c. Next, array 50c is column balanced as discussed above in conjunction with operation 56. The result of column balancing array 50c is illustrated as array 50d.

By comparing the simple load balanced array 50b with the alternating load balanced array 50d, it is apparent that the alternating load balanced array 50d has a better distribution of tasks. More specifically, the number of tasks assigned to the PEs in array 50d ranges from a low of 4 to a high of 5, whereas the number of tasks assigned to the PEs in array 50b ranges from a low of 3 to a high of 5.

It should be noted that although the alternating load balancing method discussed in conjunction with FIG. 5 quickly provides an improved balanced array for the values supplied in array 50, it may not produce the desired results in some cases. A general load balancing method, however, may be employed to overcome the shortcomings of the alternating load balancing method.

Figure 6:
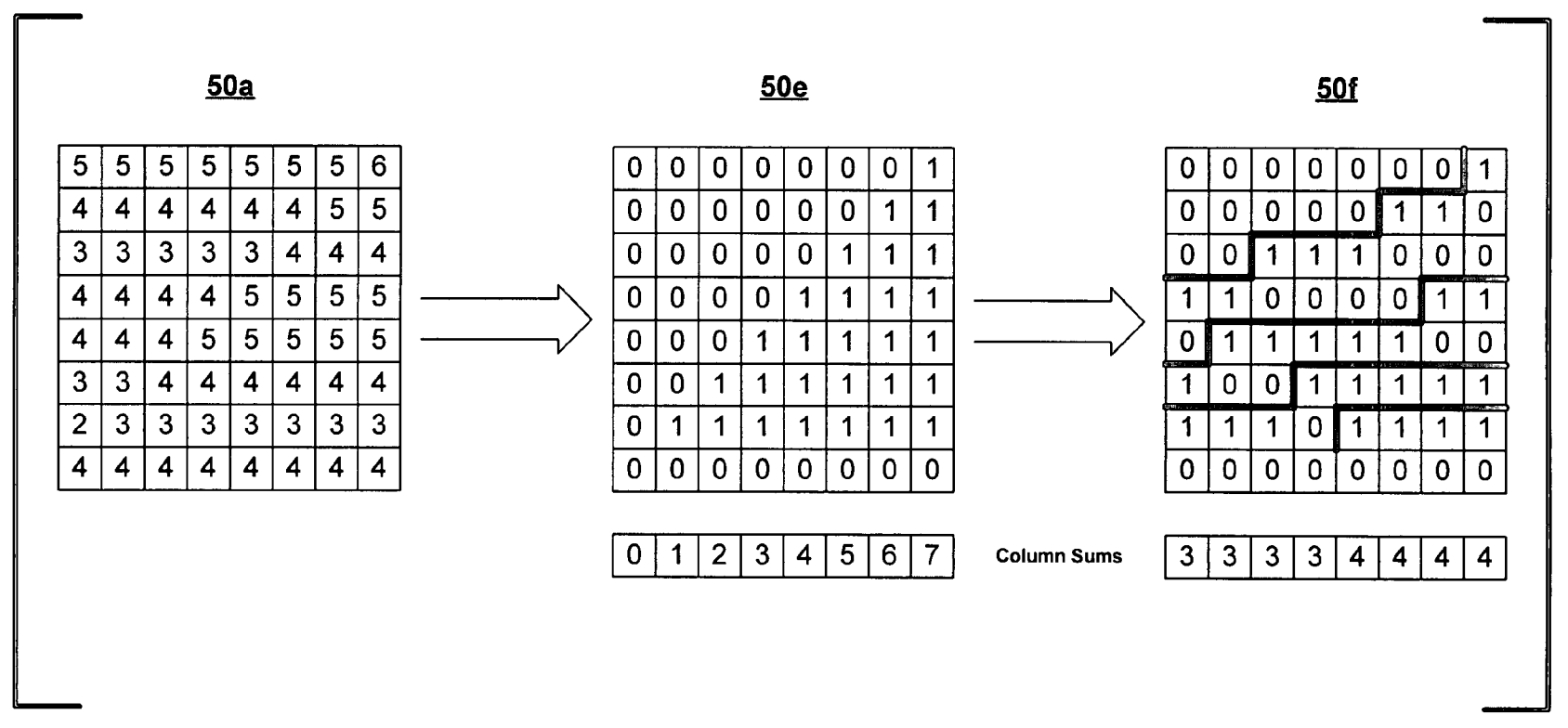

FIG. 6 is a graphical representation of a general load balancing method as applied to the array of processing elements illustrated in FIG. 3a according to an embodiment of the present invention. The method used in conjunction with FIG. 6, although somewhat more complex than the alternating method discussed in conjunction with FIG. 5, is a method that works well for all 2-D arrays.

As is apparent in FIG. 6, each row of the row-balanced array 50a has either X or (X+1) tasks associated with each PE (it should be noted that the value of X may be different for each row in the row-balanced array). In the general method of the current embodiment, the values 0 and 1 are substituted for X and (X+1), respectively. For example referring to the first row of array 50a in FIG. 6, it is apparent that X is equal to five (5) and (X+1) is equal to six (6). Likewise for the second row, X is equal to four (4) and (X+1) is equal to five (5). Thus as seen in the first row of array 50e, a zero (0) is substituted for all PEs having five (5), (i.e., X) tasks and one (1) is substituted for all PEs having six (6) (i.e., X+1) tasks and for the second row a zero (0) is substituted for all PEs having four (4) (i.e., X) tasks and one (1) is substituted for all PEs having five (5) (i.e., X+1) tasks. Likewise, a zero or one is substituted for each row of array 50a. The substitutions are completed in parallel for all rows of the array. The result of the substitution is illustrated in array 50e.

Summing the tasks on each column of array 50e, it is apparent that the columns range from zero to seven tasks per column. It should be noted that the column sums represent the different rounding errors that are incorporated into the column sums. To create an optimal load balance, it is desirable to have only two different rounding errors at the end of each dimension stage (e.g., row, column, etc.)

To limit the rounding error to two values, one embodiment of the general method of the current embodiment employs a shifting technique. Referring to arrays 50e and 50f, the first row of array 50e is not shifted. The second row down is shifted to the left until the rightmost one (1) of the second row is under the rightmost zero (0) of the row directly above (i.e., the first row). The third row down is shifted left until the rightmost one (1) of the third row is under the rightmost zero (0) of the row directly above (i.e., the second row). Each subsequent row is treated in the same manner. The effect is to create an irregular staircase of ones (1) (as illustrated by the dark lines in array 50f). Any data that "falls off" the left hand edge of the row is wrapped around onto the right hand edge of the same row. If the rows are shifted as discussed and the columns summed as shown in array 50f, the rounding errors can be limited to two values (i.e., 3 and 4).

An alternative embodiment of the general method achieves the same result (i.e., limiting the rounding error to two values) by utilizing partial column sums. For each unvisited line, the column sums for the previously visited lines are evaluated. It is then assumed that the new columns will sum to one of two values (separated by a value of 1), which is represented as U and (U+1). It should be noted that once the column sums are identified as either being represented by U or (U+), the actual value of U does not need to be used. Accordingly, a binary value (i.e., "0" or "1") may be substituted for U and (U+1) in a similar manner as described above in conjunction with FIG. 6. Likewise, the two values for the current line task number are X and (X+1), again these are assigned a binary value (0 or 1), as described in conjunction with FIG. 6. The values are arranged so that the maximum number of 1's in the current line task number row are placed in the columns having the value (U) in the old column sum row. Also, the maximum number of 0's in the current line task number row are placed in the columns having the value (U+1) in the old column sum row. There may be remaining 0's or 1's, but not both. The remaining values are placed in the unused spaces, either 0's under U, or 1's under (U+1).

Tables #1 illustrates a first case in which there are more 0 values than 1 values in the current line, whereas Table #2 illustrates a second case in which there are less 0 values than 1 values in the current line.

TABLE #1

General method, first case.

| Old Column Sum | 0 | 0 | 1 | 0 | 0 | 1 | 0 | 0 |
|---|---|---|---|---|---|---|---|---|
| Current Line Task Number | 0 | 1 | 0 | 0 | 1 | 0 | 0 | 1 |
| New Column Sum | 0 | 1 | 1 | 0 | 1 | 1 | 0 | 1 |

TABLE #1

General method, second case.

| Old Column Sum | 0 | 1 | 1 | 0 | 1 | 1 | 0 | 1 |
|---|---|---|---|---|---|---|---|---|
| Current Line Task Number | 1 | 1 | 0 | 1 | 1 | 0 | 1 | 1 |
| New Column Sum | 1 | 2 | 1 | 1 | 2 | 1 | 1 | 2 |

As can be seen in Table #1, only two values for the new column sums exist (i.e., values 0 and 1). Likewise in Table #2, only two values for the new column sums exist (i.e., values 1 or 2). In both cases, the values are separated by one value (e.g., 2−1=1). Thus, the original assumption for the two values of the column sum U and (U+1) is proved by induction. Also by observing the above tables, it should be noted that there are many different arrangements of X and (X+1) along the current line that can be used while still satisfying the above conditions. It should also be noted that that the lines could be visited in any order while remaining within the scope of the present invention.

Referring now to FIG. 7, the alternative embodiment of the general method is illustrated as applied to array 50e from FIG. 6. As seen in FIG. 7, the line task numbers in row-2 are arranged such that the maximum number of 1's in row-2 (i.e., the current line) are placed in the columns having U (here 0) in row-1 (i.e., old column sum). Also, the maximum number of 0's in row-2 are placed in the columns having (U+1) (here 1) in row-1. The partial sum of row-1 and row-2 is the calculated and labeled as "New Col. Sum 1" in FIG. 7. Note that the new values for calculated for U and U+1 (i.e., the "New Col. Sum" values) in each step are still only separated by a difference of 1 task value. Next, the line task numbers for row-3 are arranged in the same manner under the "New Col. Sum 1" and a "New Col. Sum 2" is calculated. As is evident in FIG. 7, this continues for each row in array 50e until the "Final Col. Sum" is calculated. The "Final Col. Sum" calculated in FIG. 7 contains only two rounding error values (i.e., U=3 and U+1=4), as was the case with the first embodiment of the general method as discussed above in conjunction with first FIG. 6.

It should be noted that the general method may be used to balance a K×L×M× . . . n-dimensional array as discussed above in conjunction with FIGS. 3a and 3b. For example, consider a L×M rectangular array of PEs formed by two adjacent dimensions, wherein the array has (L) PEs traversing a line in a first lower dimension, (M) lines traversing the second higher dimension, and each of the (M) lines is the second higher dimension has (L) PEs. As previously discussed, each PE in the array has a local number of tasks associated therewith.

Assuming the (L) PEs in each of the (M) lines have already been balanced in the first lower dimension, each of the balanced (M) lines will include (L) PEs with only two possible numbers of local tasks separated by 1 (e.g. W and (W+1) on the first line, X and (X+1) on the second line, Y and (Y+1) on the third line, etc.). The general method can be applied to the L×M rectangular array by balancing the (M) lines in the higher dimension, by firstly substituting a binary value (B) on each PE: zero (0) for each PE having the lower number of local tasks, e.g. W, X, Y, etc, and one (1) for each PE having the higher number of local tasks, e.g. (W+1), (X+1), (Y+1), etc, and secondly shifting the (B) values for each PE across the balanced (M) lines (rows) in the lower dimension, until each sum of the PE (B) values down each line (column) in the higher dimension has only one of two values separated by 1 (e.g., U and (U+1)).

Additionally, it should be noted that the techniques employed by the above embodiments of the general method are not completed in parallel. A row cannot assign rounding errors until the row above it has done so. Thus in the above mentioned embodiments, the rounding process must move down from the top row to the bottom row.

The 'zero-one' pattern, an example of which is shown in array 50f, may also be achieved without actually shifting any data between PEs. Referring to FIG. 8, the rows marked $M_r$ contain the same data as shown in array 50a, but with the data in a "staircase" order. As will be discussed in conjunction with operation 63 in FIG. 9, the local mean value $M_r$ can be determined from the total number of values on a row (V) using the equation: $M_r=\text{Trunc}((V+E_r)/N)$, where $E_r$ represents a number in the range of 0 to (N−1) and each PE has a different $E_r$ number. For the top row, one embodiment would set the value $E_r$ to the column index (i). Other embodiments are discussed in greater detail in conjunction with FIGS. 9 and 10a-10e. In one embodiment, the 'zero-one' order is generated using a processing parameter Q derived form the total number of tasks on the top row using the equation Q=V Mod N (i.e., Q is the remainder after dividing V by N). The value Q is passed down each column from a top row to the row below. The $E_r$ value for the new row is then updated using the equation: E'=(E+Q)Mod N. The new value for E' is used to generate the values of $M_r$ for the new row. A new value of Q is generated for the new row, is added to the previous value and is passed down to the next row. For row "j" the calculation of E generalizes to the following equation:

$$E_{j\neq 0} = \left(i + \sum_{u=0}^{u=j-1} Q_u\right) \text{Mod } N.$$

It should be noted that the above procedure generalizes to n-dimensions. Before the $M_r$ values are evaluated for each dimension, the Q values must be 'swept' serially through the lines to update the local $E_r$ values in the manner described above.

Figure 9:
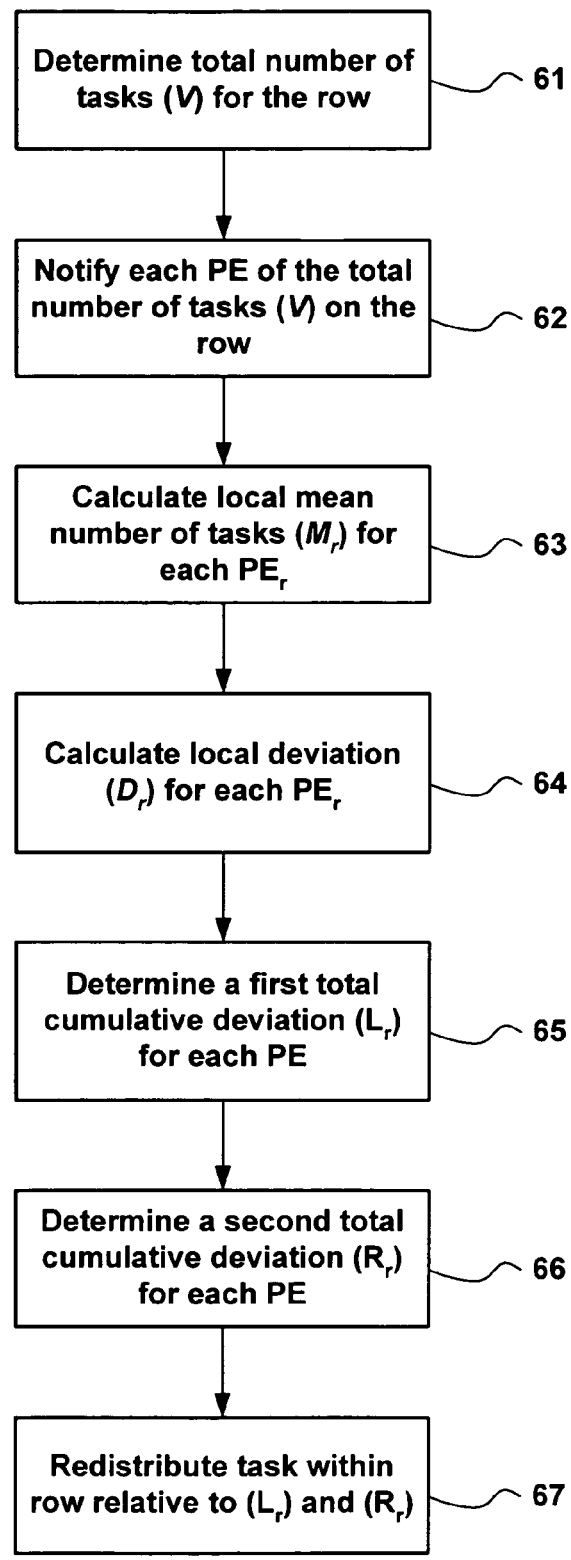
FIG. 9 is a detailed operational process for balancing a single dimension of an n-dimensional array of processing elements according to an embodiment of the present invention.

FIG. 9 is a detailed operational process 60 for balancing a single dimension of the n-dimensional array of processing elements according to an embodiment of the present invention. In the interest of simplicity, the current embodiment will be discussed with respect to balancing the rows of the simple-connected array 50, however, it should be apparent to one skilled in the art that operational process 60 may be applied any n-dimensional array having other connection types (such as loop-connection) and to other dimensional lines (such as columns) within the array.

Operational process 60 begins by determining the total number of tasks (V) present for each line of the chosen dimension in operation 61. It should be noted that "line" refers to a group of interconnected processing elements 30 within a single dimension (for example, a row, a column, etc.). In the current embodiment, each row in array 50 is comprised of eight (8) PEs. Each $PE_r$ (where r=0 to 7, e.g., $PE_0$, $PE_1$, . . . $PE_7$) in the row has a local number of tasks ($v_r$) associated therewith.

In the current embodiment, a partial sum ($S_r$) of the number of tasks ($v_r$) is passed from a first end of the row to a second end of the row (e.g., from the leftmost PE to the rightmost PE). The sum ($S_r$) is initialized to the number of tasks on the first end (here $S_0=v_0$). The partial sum ($S_r$) is then passed serially from $PE_r$ to $PE_{r+1}$ (i.e., from left to right). Each $PE_r$ receives the partial sum and adds it's own number of tasks to the partial sum (i.e., $S_r=S_{r-1}+v_r$). After adding it's number of tasks ($v_r$), $PE_r$ passes the partial sum ($S_r$) to $PE_{r+1}$. When the partial sum ($S_r$) reaches the right end (i.e., $PE_{N-1}$), the last tasks ($v_{N-1}$) are added to form the total sum of tasks (V). The sum (V) can be expressed by the equation $$V = \sum_{i=0}^{i=N-1} v_i,$$

where N represents the number of PEs 30 in the row, and $v_i$ represents the local number of tasks associated with a local $PE_r$ in the row. It should also be noted that in the current discussion, "local" refers to the values or functions associated with a single PE within the row, whereas "global" refers to the values or functions associated with the entire row of PEs.

A simplified representation of array 50 showing each PE's associated number of tasks assigned is illustrated in FIG. 5. Referring to the first row of array 50 in FIG. 5, $PE_0$ has 2 tasks associated therewith (i.e., $v_0=2$). Thus, the initial value for the partial sum is also 2 (i.e., $S_0=v_0=2$). The partial sum is then passed to $PE_1$, which has 4 tasks associated therewith (i.e., $v_1=4$). The number of tasks associated with $PE_1$ is then added to the partial sum $S_0$ (i.e., $S_1=S_0+v_1$) to obtain $S_1=6$. The partial sum continues to be passed serially until it reaches the right end of the first row (i.e., $PE_7$). For the first row of PEs as illustrated in FIG. 5, the total sum of tasks on the row is equal to 41 (i.e., V=41). It should be noted that in the current embodiment, the total number of tasks (V) for each line in the chosen dimension (e.g., for each row of the array) is calculated in parallel.

After the total number of tasks (V) present on a line is determined in operation 61, each PE 30 on the line is notified of the total number of tasks (V) on that line in operation 62. In the current embodiment, the total number of tasks (V) is transferred within a row from right to left (i.e., from $PE_7$ to $PE_0$). Each PE in the row locally saves the total number of tasks (V) for that row. It should be apparent to one skilled in the art that the direction of travel in operations 61 and 62 may be altered while remaining within the scope of the present invention. For example, the direction of travel for operations 61 and 62 may be changed from left/right to right/left and from right/left to left/right, respectively. It should further be noted that operation 62 is also completed in parallel for each line in the chosen dimension.

After the total number of tasks (V) present on the first row is distributed in operation 62, the local mean number ($M_r$) of tasks for each $PE_r$ in the row is calculated in operation 63. In the current embodiment, the local mean value is computed using the rounding function $M_r=\text{Trunc}((V+E_r)/N)$ (where $M_r$ represents the local mean for $PE_r$, N represents the total number of PEs 30 in the row, and $E_r$ represents a number in the range of 0 to (N−1), as derived in conjunction with the general method illustrated in Table #1 and Table #2), to ensure that no instructions are lost or "gained" during the rounding process if the value of V÷N is not an integer (i.e., to ensure that $$V = \sum_{i=0}^{i=N-1} M_i,$$

where N represents the number of PEs 30 in the row, and $M_i$ represents the local mean of tasks associated with a local $PE_r$ in the row). The rounding function is discussed in more detail in U.S. patent application Ser. No. 10/689,389 entitled "Method for Rounding Values for a Plurality of Parallel Processing Elements" filed Oct. 20, 2003 and incorporated in its entirety by reference herein.

For example in the current embodiment, 41 tasks (i.e., V=41) are to be shared by the eight PEs in the first row (i.e., $PE_0$ through $PE_7$) of array 50. Without using the rounding function, the local mean for each PE would be $PE_r$=5.125 (i.e., 41÷8=5.125). If the fraction ⁴⅛ is designated to round down for each PE (i.e., 41÷8=5), then the sum of the means for all of the individual PEs (i.e., $PE_0$ through $PE_7$) will equal to 40. Thus, one (41−40=1) task is "lost". In contrast, if the fraction ⁴⅛ is designated to round up for each PE (i.e., 41÷8=6), then the sum of the means for all of the individual PEs (i.e., $PE_0$ through $PE_7$) will equal to 48. Thus, seven (48−41=7) tasks are "gained".

The rounding function $M_r=\text{Trunc}((V+E_r)/N)$ prevents tasks from being lost or gained. In the current embodiment, each PE is assigned a different $E_r$ value for controlling the rounding. The simplest form for the function E is the case in which $E_r=P_r$, where $P_r$ represents the PEs position in the row. For example, for $PE_0$, $E_0=0$; for $PE_1$, $E_1=1$; for $PE_2$, $E_2=2$; etc. By assigning each PE in the row a different $E_r$ value, the rounding function can be controlled such that some of the local means are rounded up and some of the local means are rounded down, thus insuring that $$V = \sum_{i=0}^{i=N-1} M_i.$$

It should be noted that in the current embodiment, the local mean for each PE 30 in the row is computed in parallel with the local means of the other PEs in the row. It should further be noted that the local mean for PEs in all the rows of the array are computed in parallel.

Table #3 illustrates the local mean calculation for the first row of array 50 as illustrated in FIG. 5 in which the total number of tasks on the row is equal to forty-one (41). Referring to Table #3, it is apparent that the rounding function controls the rounding such that $M_0$ through $M_6$ are rounded to five (5), whereas $M_7$ is rounded to six (6). The sum of the values of $M_0$ through $M_7$ is equal to forty-one (41), which is equal to the total number of tasks (V) on the first row. Thus, tasks were neither lost nor gained due to rounding.

TABLE #3

Local Mean Calculation for the First Row of Array 50 (V = 41, N = 8).

| $PE_r$ | $V_r$ | $E_r$ | $(V + E_r)/N$ | $M_r = \text{Trunc}((V + E_r)/N)$ | $D_r$ |
|---|---|---|---|---|---|
| $PE_0$ | 2 | 0 | 5.125 | 5 | −3 |
| $PE_1$ | 4 | 1 | 5.25 | 5 | −1 |
| $PE_2$ | 6 | 2 | 5.375 | 5 | 1 |
| $PE_3$ | 8 | 3 | 5.5 | 5 | 3 |
| $PE_4$ | 3 | 4 | 5.625 | 5 | −2 |
| $PE_5$ | 4 | 5 | 5.75 | 5 | −1 |
| $PE_6$ | 6 | 6 | 5.875 | 5 | 1 |
| $PE_7$ | 8 | 7 | 6 | 6 | 2 |

Table #4 illustrates the local mean calculation for the second row of PEs of array 50 as shown in FIG. 5. Each $PE_r$ calculates its local mean ($M_r$). Using operation 61, the total number of tasks (V) associated with the second row is determined to be thirty-four (34). Using operation 62, this value is distributed to each PE in the second row. Referring to Table #4, it is apparent that the rounding function controls the rounding such that $M_0$ through $M_5$ are rounded to four (4), whereas $M_6$ and $M_7$ are rounded to five (5). The sum of the values of $M_0$ through $M_7$ is equal to thirty-four (34). As expected, the sum of the local means ($M_r$) is equal to the total number of tasks (V).

TABLE #4

Local Mean Calculation for the Second Row of Array 50 (V + 34, N = 8).

| $PE_r$ | $V_r$ | $E_r$ | $(V + E_r)/N$ | $M_r = Trunc((V + E_r)/N)$ | $D_r$ |
|---|---|---|---|---|---|
| $PE_0$ | 1 | 0 | 4.25 | 4 | −3 |
| $PE_1$ | 3 | 1 | 4.375 | 4 | −1 |
| $PE_2$ | 5 | 2 | 4.5 | 4 | 1 |
| $PE_3$ | 7 | 3 | 4.625 | 4 | 3 |
| $PE_4$ | 2 | 4 | 4.75 | 4 | −2 |
| $PE_5$ | 4 | 5 | 4.875 | 4 | 0 |
| $PE_6$ | 5 | 6 | 5 | 5 | 0 |
| $PE_7$ | 7 | 7 | 5.125 | 5 | 2 |

After the local means ($M_r$) are computed in operation 63, the local deviation Dr is calculated for each $PE_r$ in the line in operation 64. In the current embodiment, the local deviation is simply the difference between the local value and the local mean (i.e., $D_r=v_r-M_r$). For example referring to Table 3, the local deviation for $PE_0$ in the first row of array 50 is −3 (i.e., $D_0=2-5=-3$). It should be noted that in the current embodiment, the local deviation for each PE 30 in the row is computed in parallel with the local deviation of the other PEs in the row. It should further be noted that the local deviation for PEs in all the rows of the array are computed in parallel.

After the local deviations ($D_r$) are computed in operation 64, a first local cumulative deviation ($L_r$) for each PE in the line is determined in operation 65. In the current embodiment, the first local cumulative deviation ($L_r$) is calculated from left to right (i.e., from $PE_0$ to $PE_7$). The first local cumulative deviation ($L_r$) is determined in a similar manner as that used to form the partial value sum (V) in operation 61. In operation 65, however, the local deviations ($D_r$) are summed instead of the number of tasks ($v_r$).

Additionally, the local $PE_r$ does not need to be notified of the first local cumulative deviation for "downstream" PEs (i.e., PEs which come after $PE_r$ for a chosen direction of travel). In contrast, the first local cumulative deviation for a specific $PE_r$ is the sum of the local deviations for each of the upstream (i.e., previous) PEs within the row. For example in the current embodiment in which the direction of travel for each row is left to right, the first local cumulative deviation for $PE_3$ is $L_3=D_0+D_1+D_2=-3-1+1=-3$. Thus, $PE_3$ does not need to be notified of the first local cumulative for the downstream PEs (i.e., for $PE_4$ through $PE_7$). The first local cumulative deviation ($L_r$) can be represented by the equation:

$$L_r = \sum_{i=1}^{i=r-1} D_i,$$

where r represents the local number of the specific PE for which the first local cumulative deviation is being calculated, and $D_i$ represents the local deviation associated with the "upstream" PEs in the row.

After first local cumulative deviation ($L_r$) is determined in operation 65, the second local cumulative deviation ($R_r$) is determined for each PE in the line in operation 66. In the current embodiment, the second local cumulative deviation ($R_r$) is simply evaluated by observing that the sum of deviation across the whole line must be zero. Thus, the second local cumulative deviation can be expressed as $R_r=D_r-L_r$. For example in the current embodiment, the second local cumulative deviation for $PE_3$ is found to be $R_3=-(3)-(-3)=0$. In the current embodiment, $R_r=-D_r-L_r$ is evaluated locally, in parallel on all PEs in the line. It should be noted, however, that $R_r=-D_r-L_r$ may also be evaluated serially while remaining within the scope of the present invention.

After the first local cumulative deviation ($L_r$) and the second local cumulative deviation ($R_r$) are determined for each PE in operations 65 and 66, respectively, the tasks associated with each PE are redistributed among the PEs relative to the values obtained for $L_r$ and $R_r$. In the current embodiment, a positive $L_r$ parameter represents the number of tasks, to the left of the current $PE_r$, that are "surplus to the requirements". A negative $L_r$ value, represents the "shortfall" in the number of tasks to the left to the current $PE_r$. Thus if $L_r$ is positive, this number of tasks will be received from the left PE, whereas if $L_r$ is negative, this number of tasks will need to be transmitted to the left PE. Similarly, if $R_r$ is positive, this number of tasks will be received from the right PE, whereas if $R_r$ is negative, this number of tasks will need to be transmitted to the right PE.

If the local deviation ($D_r$) is negative, one or more of the received values will be "absorbed" by the local PE to make up the local deficit. The other received values (if any) will be transmitted, either from left to right, or from right to left depending on the values for $L_r$ and $R_r$. On occasion, some PEs may start off with no values at all, these PEs may have to "mark time" until they receive a value. It should be noted that in the current embodiment, only one task (per direction) is transferred between PEs at a time. For example, only one task may be transferred between $PE_3$ and $PE_2$, however, another task may be transferred in the other direction (i.e., between $PE_3$ and $PE_4$) at the same time. After each successful transmission or receipt, the values for $D_r$, $L_r$, and $R_r$ are updated. The redistribution stage terminates when $D_r=L_r=R_r=0$ for all PEs in the line. (It should be noted that the redistribution for the entire array terminates when $D_r=L_r=R_r=0$ for all PEs in every line of the array.)

Figure 10A:
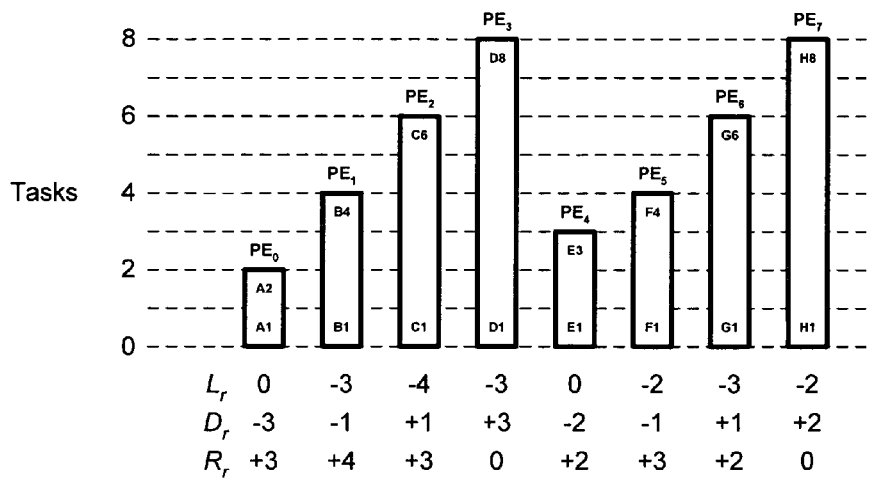
FIGS. 10a-10e are graphical representations of the detailed operational process of FIG. 4 according to an embodiment of the present invention.

FIGS. 10a-10e are a graphical representation of the load balancing method as applied to the first row of processing elements in array 50 (as illustrated in FIG. 5) according to an embodiment of the present invention. In FIGS. 10a-10e, each PE (i.e., $PE_0$ ... $PE_7$) is represented by a bar, the height of which indicates the number of tasks ($v_r$) associated with the specific PE. FIGS. 10a-10e also include the local deviation ($D_r$), the first local cumulative deviation ($L_r$), and the second local cumulative deviation ($R_r$) for each $PE_r$ within the first row of array 50. Referring to FIG. 10a for example, $PE_3$ has a local deviation of +3 (i.e., $D_3=M_3-v_3=+3$), a first local cumulative of deviation −3 (i.e., $L_3=-3$), and a second local cumulative deviation +0 (i.e., $R_3=0$).

FIG. 10a represents the first row as illustrated in FIG. 5 (i.e., the initial number of tasks assigned to each PE in FIG. 10a is the same as illustrated in FIG. 5). Accordingly, the total number of tasks (V) is equal to forty-one (41). As discussed in conjunction with Table 3, the local mean number ($M_r$) is equal to five (5) for $PE_0$-$PE_6$ and equal to six (6) for $PE_7$. In the current embodiment, the local deviation ($D_r$), the first local cumulative deviation ($L_r$), and the second local cumulative deviation ($R_r$) are calculated as discussed in conjunction with FIG. 9.

Figure 10B:
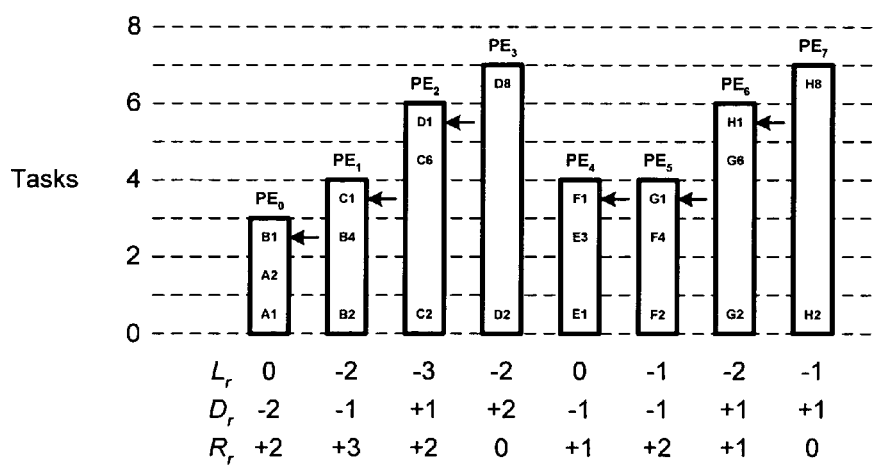

FIG. 10b represents the first row after a first redistribution of tasks has taken place. It should be noted that the number of tasks transferred and the direction in which the tasks are transferred are related to the first local cumulative deviation ($L_r$) and the second local cumulative deviation ($R_r$). As discussed above in conjunction with FIG. 9, a positive $L_r$ represents the number of tasks that will be received by the local $PE_r$ from its left-neighbor $PE_{r-1}$, whereas a negative $L_r$ represents the number of tasks that the local $PE_r$ transmits to its left-neighbor $PE_{r-1}$. Similarly, a positive $R_r$ represents the number of tasks that will be received by the local $PE_r$ from its right-neighbor $PE_{r+1}$, whereas a negative $R_r$ represents the number of tasks that the local $PE_r$ transmits to its right-neighbor $PE_{r+1}$.

$PE_3$, for example, initially has a first local cumulative deviation of −3 (i.e., $L_3$=−3), and a second local cumulative deviation of zero (i.e., $R_3$=0). Accordingly, one task is transferred to its left-neighbor $PE_{r-1}$ (i.e., $PE_2$), but no tasks are received from its right-neighbor $PE_{r+1}$ (i.e., $PE_4$) (as indicated by the arrows in FIG. 10b). Similarly, $PE_2$ initially has a first local cumulative deviation of 4 (i.e., $L_4$=4), and a second local cumulative deviation of +3 (i.e., $R_2$=+3). Accordingly, one task is transferred to its left-neighbor $PE_{r-1}$ (i.e., $PE_1$), and one task is received from its right-neighbor $PE_{r+1}$ (i.e., $PE_3$) (as indicated by the arrows in FIG. 10b). Tasks are transferred between the other PE's in the same manner. After the transfer is completed, the local deviation, the first local cumulative deviation and a second local cumulative deviation are recalculated for each PE, for example, $D_3$=+2, $L_3$=−2 and $R_3$=0, respectively, after the first transfer.

Figure 10C:
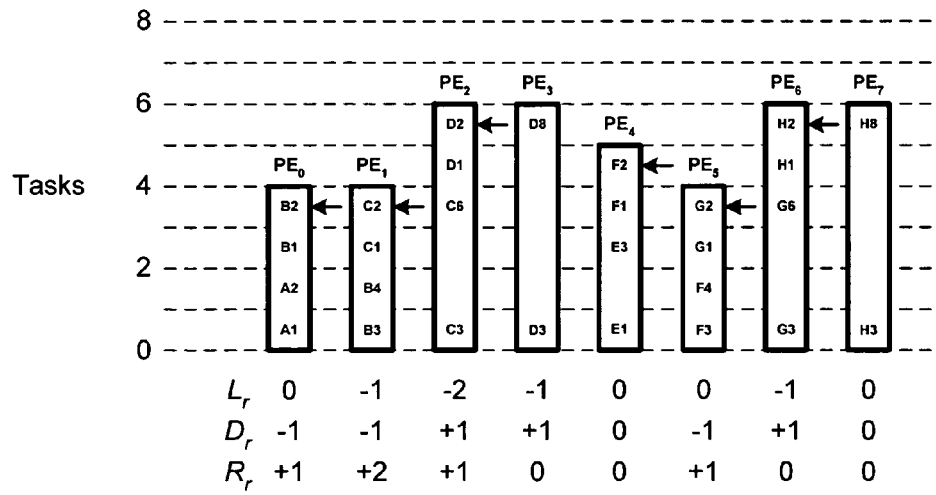

FIG. 10c illustrates the next transfer of tasks between the PEs. $PE_3$, for example, transfers another task to its left-neighbor $PE_{r-1}$ (i.e., $PE_2$), but no tasks are received from its right-neighbor $PE_{r+1}$ (i.e., $PE_4$). After the transfer is completed, the local deviation, the first local cumulative deviation and the second local cumulative deviation are recalculated for each PE, for example, $D_3$=+1, $L_3$=−1 and $R_3$=0, respectively.

Figure 10D:
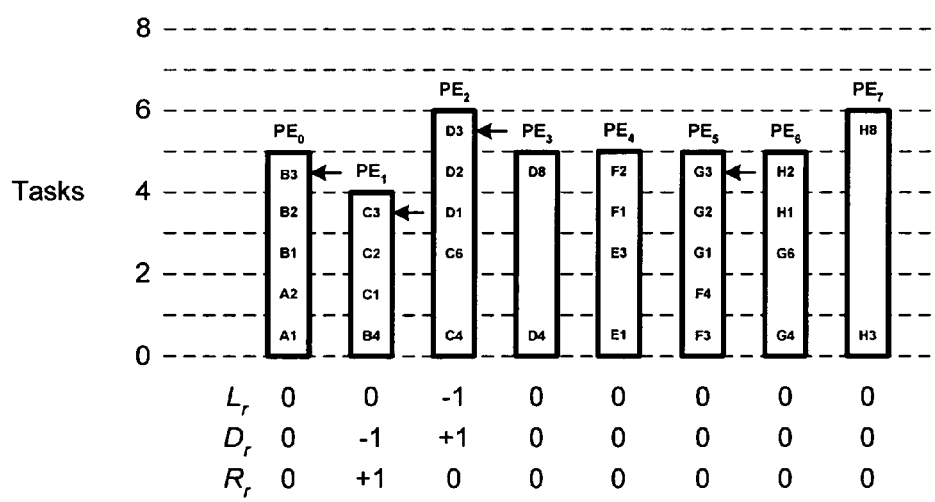

FIG. 10d illustrates the next transfer of tasks between the PEs. $PE_3$, for example, transfers another task to its left-neighbor $PE_{r-1}$ (i.e., $PE_2$). Again, because $R_3$=0 (and likewise $L_4$=0), $PE_3$ does not receive a task from its right-neighbor $PE_{r+1}$ (i.e., $PE_4$). After the transfer is completed, the local deviation, the first local cumulative deviation and the second local cumulative deviation are recalculated for each PE, for example, $D_3$=+0, $L_3$=0 and $R_3$=0, respectively.

Figure 10E:
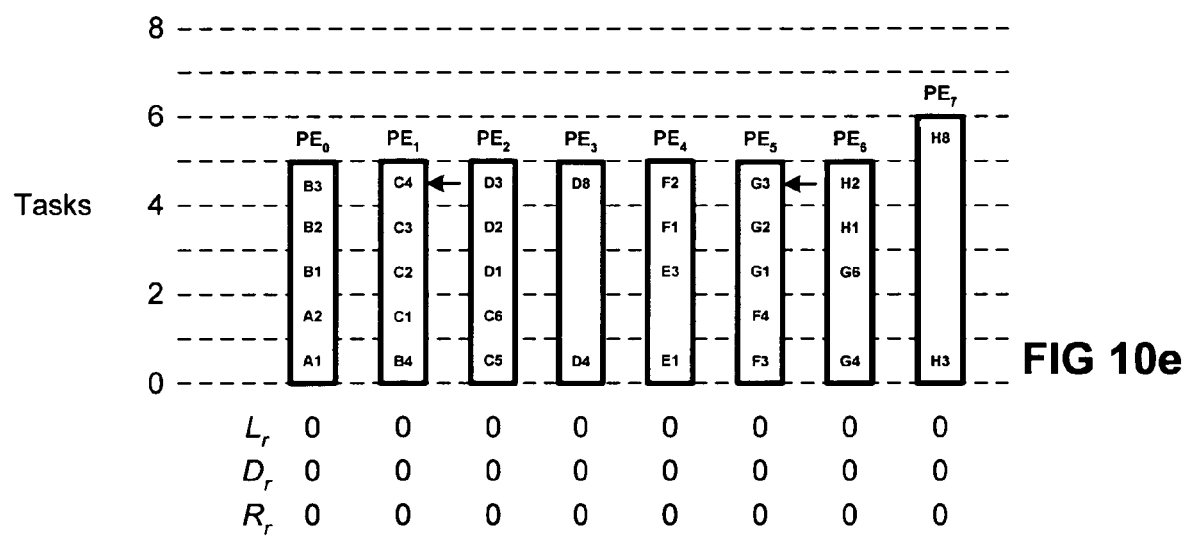

FIG. 10e illustrates the final transfer of tasks between the PEs. As seen in FIG. 10d, only $PE_1$ and $PE_2$ have non-zero local and cumulative deviation values. Thus, tasks will be transferred only between $PE_1$ and $PE_2$. Referring to FIG. 10e, $PE_2$ transfers a task to $PE_1$. After the transfer is completed, the local deviation, the first local cumulative deviation and the second local cumulative deviation are recalculated for each PE. As illustrated, the local and cumulative deviations for all PEs equals zero. Thus, the load is balanced among all PEs and further transfers are not necessary.

It should be noted that in the current embodiment, each row in the array 50 is balanced in parallel using the method discussed above to obtain the row-balanced array 50a as illustrated by FIG. 5a. It should further be noted that the method discussed in conjunction with FIG. 9 can be used for any dimension of an n-dimensional array.

It should be recognized that the above-described embodiments of the invention are intended to be illustrative only. Numerous alternative embodiments may be devised by those skilled in the art without departing from the scope of the following claims.

What is claimed is:

1. A method for balancing the work load of an n-dimensional array of processing elements(PEs), wherein each dimension of said array includes said processing elements arranged in a plurality of lines and wherein each of said processing elements has a local number of tasks associated therewith, the method comprising:

balancing a work load across at least one line of processing elements in a first dimension by redistributing the tasks amongst the processing elements in said line;

balancing a work load across at least one line of processing elements in a next dimension by redistributing the tasks amongst the processing elements in said line; and repeating said balancing at least one line of processing elements in a next dimension by redistributing the task among the processing elements in said line for each dimension of said n-dimensional array until the work load is balanced across all said processing elements; and wherein said balancing a work load comprises:

calculating a total number of tasks for said line, wherein said total number of tasks for said line equals the sum of said local number of tasks for each of said processing elements on said line;

notifying each of said processing elements on said line of said total number of tasks for said line;

calculating a local mean number of tasks for each of said processing elements on said line;

calculating a local deviation from local mean number for each of said processing elements on said line;

determining a first local cumulative deviation for each of said processing elements on said line;

determining a second local cumulative deviation for each of said processing elements on said line; and redistributing tasks among said processing elements on said line in response to at least one of said first local cumulative deviation and said second local cumulative deviation.

2. The method of claim 1 wherein two or more lines in at least one of said first dimension and said next dimension are balanced in parallel.

3. The method of claim 1 wherein said calculating a total number of tasks for said line comprises sequentially summing said local number of tasks for each of said processing elements on said line from a first end of said line to a second end of said line.

4. The method of claim 1 wherein said calculating said total number of tasks for said line includes solving the equation $$V = \sum_{i=0}^{i=N-1} v_i,$$

where V represents said total number of tasks for said line, N represents the number of processing elements on said line, and $v_i$ represents said local number of tasks for a local $PE_r$ on said line.

5. The method of claim 1 wherein said notifying step includes passing said total number of tasks from a second end of said line to a first end of said line.

6. The method of claim 1 wherein said calculating a local mean number of tasks includes solving the equation $M_r$=Trunc(($V+E_r$)/N), where $M_r$ represents said local mean for a local processing element $PE_r$ on said line, N represents the total number of PEs on said line, V is the total number of tasks, and $E_r$ is a number in the range of 0 to (N−1).

7. The method of claim 6 wherein each processing element has a different $E_r$ value.

8. The method of claim 6 wherein said Trunc function is responsive to $E_r$ such that said total number of tasks for said line is equal to the sum of the local mean number of tasks for each processing element on said line.

9. The method of claim 6 wherein said local mean $M_r=\mathrm{Trunc}((V+E_r)/N)$ for each local $PE_r$ on said line is equal to either X or (X+1), where X is equal to local mean.

10. The method of claim 1 wherein said calculating a local deviation for each processing element on said line includes finding a difference between said local number of tasks for each $PE_r$ and said local mean number of tasks for each $PE_r$.

11. The method of claim 1 wherein said determining a first local cumulative deviation includes sequentially summing said local deviations for each $PE_r$ from a first end of said line to an adjacent upstream $PE_{r-1}$ on said line.

12. The method of claim 1 wherein said determining a second local cumulative deviation includes finding a difference between the negative of said local deviation for each $PE_r$ and said first local cumulative deviation for each $PE_r$.

13. The method of claim 1 wherein said redistributing tasks among said processing elements on said line comprises:
 transferring a task from a local $PE_r$ to a left-adjacent $PE_{r-1}$ if said first local cumulative deviation for said local $PE_r$ is a negative value; and
 transferring a task from said local $PE_r$ to a right-adjacent $PE_{r+1}$ if said second local cumulative deviation for said local $PE_r$ is a negative value.

14. The method of claim 1 wherein said redistributing tasks among said processing elements on said line comprises:
 transferring a task from a local $PE_r$ to a left-adjacent $PE_{r-1}$ if said second local cumulative deviation for said local $PE_r$ is a positive value; and
 transferring a task from said local $PE_r$ to a right-adjacent $PE_{r+1}$ if said first local cumulative deviation for said local $PE_r$ is a positive value.

15. The method of claim 1 wherein said calculating a local mean number of tasks; said calculating a local deviation; said determining a first local cumulative deviation; said determining a second local cumulative deviation; and said redistributing tasks are completed in parallel for each processing element on said line.

16. The method of claim 15 wherein said calculating a local mean number of tasks; said calculating a local deviation; said determining a first local cumulative deviation; said determining a second local cumulative deviation; and said redistributing tasks are completed in parallel for each line in a selected dimension.

17. The method of claim 1 wherein said calculating a local deviation, said determining a first local cumulative deviation, said determining a second local cumulative deviation, and said redistributing tasks among said processing elements are repeated until said local deviation, said first local cumulative deviation, and said second local cumulative deviation for each of said processing elements is zero.

18. A method for balancing a work load across one dimension of an n-dimensional array of processing elements(PEs), wherein each of said n-dimensions is traversed by a plurality of lines and wherein each of said lines has a plurality of processing elements with a local number of tasks associated therewith, the method comprising:
 balancing said plurality of lines in one dimension by redistributing tasks amongst the processing elements in each of said plurality of lines;
 balancing said plurality of lines in a next higher dimension;
 repeating said balancing said plurality of lines in a next higher dimension for each remaining dimension of said n-dimensional array, wherein each of said balanced lines includes PEs with either a number of local tasks equal to X or a number of local tasks equal to (X+1), where X equals a local mean;
 substituting the value zero (0) for each processing element having X local number of tasks;
 substituting the value one (1) for each processing element having (X+1) local number of tasks; and
 shifting said values for each processing element within said balanced lines until a sum of said processing elements relative to a second dimension has only two different values, wherein shifting said values represents moving a task.

19. The method of claim 18 wherein said balancing said plurality of lines in one dimension comprises:
 calculating a total number of tasks present within at least one of said lines;
 notifying each processing element on said line of said total number of tasks for said line;
 determining each processing element's share of said total number of tasks on said line;
 calculating a local deviation from said previous steps;
 determining a first local cumulative deviation for each processing element on said line using said local deviation;
 determining a second local cumulative deviation for each processing element on said line using said local deviation; and
 redistributing tasks among each processing element on said line in response to at least one of said first local cumulative deviation and said second local cumulative deviation.

20. The method of claim 19 wherein said notifying each processing element comprises: serially summing said total number of tasks present on said line; and transmitting said total number of tasks to each processing element on said line.

21. The method of claim 19 wherein said determining each processing element's share of said total number of tasks comprises:
 calculating a local mean number of tasks for each processing element on said line; and
 calculating a local deviation from said local mean number of tasks for each processing element on said line by finding the difference between said local number of tasks and said local mean number of tasks for each processing element on said line.

22. The method of claim 21 wherein said calculating a local mean number of tasks for each processing element on said line comprises using a rounding function $M_r=\mathrm{Trunc}((V+E_r)/N)$, where $M_r$ represents said local mean of a local processing elements $PE_r$, N represents the total number of processing elements on said line, V is the total number of tasks, and $E_r$ represents a number in the range of 0 to (N−1).

23. The method of claim 22 wherein said Trunc function is responsive to $E_r$ such that said total number of tasks for said line is equal to the sum of the local mean number of tasks for each of said processing elements in said line.

24. The method of claim 22 wherein said local mean $M_r=\mathrm{Trunc}((V+E_r)/N)$ for each local processing element on said line is equal to either X or (X+1), where X is equal to a local mean.

25. The method of claim 19 wherein said determining a first local cumulative deviation for each processing element on said line includes summing said local deviations for each upstream processing element on said line.

26. The method of claim 19 wherein said determining a second local cumulative deviation for each processing element on said line includes finding the difference between the negative of said local deviation and said first local cumulative deviation for each processing element on said line.

27. The method of claim 19 wherein said redistributing tasks among each processing element on said line in response to at least one of said first local cumulative deviation and said second local cumulative deviation comprises:

transferring a task from a first processing element on said line to a second processing element on said line if said first local cumulative deviation for said first processing element is a negative value; and transferring a task from said second processing element on said line to said first processing element on said line if said first local cumulative deviation for said second processing element is a positive value.

28. The method of claim 19 wherein said redistributing tasks among each processing element on said line in response to at least one of said first local cumulative deviation and said second local cumulative deviation comprises:

transferring a task to a first processing element on said line from a second processing element on said line if said second local cumulative deviation for said first processing element is a negative value; and transferring a task to said second processing element on said line from said first processing element on said line if said second local cumulative deviation for said second processing element is a positive value.

29. The method of claim 21 wherein said calculating a local deviation, said determining a first local cumulative deviation, said determining a second local cumulative deviation, and said redistributing tasks among said processing elements are repeated until said local deviation, said first local cumulative deviation, and said second local cumulative deviation for each of said processing elements is zero.

30. A computer memory storing a set or instructions which, when executed, perform method for balancing a work load across one dimension of an n-dimensional array of processing elements(PEs), wherein each of said n-dimensions is traversed by a plurality of lines and where each of said lines has a plurality processing elements with a local number of tasks associated therewith, the method comprising:

balancing said plurality of lines in one dimension by redistributing tasks amongst the processing elements in each of said plurality of lines;

balancing said plurality of lines in a next higher dimension;

repeating said balancing said plurality of lines in a next higher dimension for each remaining dimension of said n-dimensional array, wherein each of said balanced lines includes PEs with either a number of local tasks equal to X or a number of local tasks equal to (X+1), where X equals a local mean;

substituting the value zero (0) for each processing element having X local number of tasks;

substituting the value one (1) for each processing element having (X+1) local number of tasks; and shifting said values for each processing element within said balanced lines until a sum of said processing elements relative to a second dimension has only two different values, wherein shifting said values represents moving a task.

\* \* \* \* \*

UNITED STATES PATENT AND TRADEMARK OFFICE
CERTIFICATE OF CORRECTION

PATENT NO. : 7,472,392 B2  Page 1 of 1
APPLICATION NO. : 10/689365
DATED : December 30, 2008
INVENTOR(S) : Beaumont It is certified that error appears in the above-identified patent and that said Letters Patent is hereby corrected as shown below:

In column 19, line 60, in Claim 18, before "lines" insert -- said --.

In column 22, line 3, in Claim 30, delete "or" and insert -- of --, therefor.

In column 22, line 4, in Claim 30, after "perform" insert -- a --.

In column 22, line 7, in Claim 30, delete "where" and insert -- wherein --, therefor.

In column 22, line 8, in Claim 30, after "plurality" insert -- of --.

In column 22, line 12, in Claim 30, before "lines" insert -- said --.

In column 22, line 18, in Claim 30, before "equal" delete "tasks".

Signed and Sealed this

Twenty-fourth Day of March, 2009

JOHN DOLL
*Acting Director of the United States Patent and Trademark Office*